(12) United States Patent  (10) Patent No.: US 8,479,665 B2
Kim et al.  (45) Date of Patent: Jul. 9, 2013

(54) REAR SEAT TABLE ASSEMBLY FOR VEHICLE

(75) Inventors: Hyun Kim, Hwaseong-si (KR); Hee Sang Park, Hwaseong-si (KR); June Kyu Park, Hwaseong-si (KR); Jung Hwan Yun, Seoul (KR); Ho Sik Choi, Hwaseong-si (KR)

(73) Assignee: Kia Motors Corporation, Seoul (KR)

( * ) Notice: Subject to any disclaimer, the term of this patent is extended or adjusted under 35 U.S.C. 154(b) by 335 days.

(21) Appl. No.: 12/940,914

(22) Filed: Nov. 5, 2010

(65) Prior Publication Data

US 2012/0049585 A1 Mar. 1, 2012

(30) Foreign Application Priority Data

Aug. 31, 2010 (KR) ........................ 10-2010-0084853

(51) Int. Cl.
*A47B 37/00* (2006.01)
*A47B 83/02* (2006.01)

(52) U.S. Cl.
USPC ............................................ 108/44; 297/145

(58) Field of Classification Search
USPC ......... 108/44, 157.11, 42; 297/135, 140–146, 297/148–154, 173
See application file for complete search history.

(56) References Cited

U.S. PATENT DOCUMENTS

| 363,226 | A | * | 5/1887 | Gowell | 297/141 |
| 3,632,161 | A | * | 1/1972 | Arfaras et al. | 297/145 |
| 4,944,552 | A | * | 7/1990 | Harris | 297/145 |
| 5,547,247 | A | * | 8/1996 | Dixon | 297/145 |
| 5,799,964 | A | * | 9/1998 | Chao | 280/304.1 |
| 6,220,658 | B1 | * | 4/2001 | Lukawski et al. | 297/145 |
| 6,347,590 | B1 | * | 2/2002 | D'Annunzio et al. | 108/44 |
| 6,793,281 | B2 | * | 9/2004 | Duerr et al. | 297/147 |
| 7,143,701 | B2 | * | 12/2006 | Lindstrom et al. | 108/44 |
| 7,506,923 | B1 | * | 3/2009 | Gauss | 297/150 |
| 7,641,252 | B2 | | 1/2010 | Sturt et al. | |
| 7,798,072 | B2 | * | 9/2010 | Becker et al. | 108/42 |
| 2004/0217615 | A1 | * | 11/2004 | Lindstrom et al. | 296/24.34 |
| 2010/0319588 | A1 | * | 12/2010 | Hanna et al. | 108/20 |

FOREIGN PATENT DOCUMENTS

| JP | 9-207678 A | 8/1997 |
| JP | 10-244879 A | 9/1998 |
| JP | 10-272972 A | 10/1998 |

(Continued)

*Primary Examiner* — Janet M Wilkens
*Assistant Examiner* — Timothy M Ayres
(74) *Attorney, Agent, or Firm* — Morgan, Lewis & Bockius LLP

(57) ABSTRACT

An rear seat table assembly for a vehicle, the rear seat table assembly may include a rear seat table placed in front of a rear seat console, wherein the rear seat table includes an upper table and a lower table which may be selectively foldable around a table hinge portion pivotally connecting the upper table and the lower table, a locking unit arranged in the rear seat console and selectively lock the rear seat table to the rear seat console so as to maintain or release a locking state of the rear seat table, a rotation unit rotatably connecting the rear seat table and the rear seat console for allowing the rear seat table to be fixed after the rear seat table may be rotated upward centering around a rotation axis (axis X) which may be fixed to an upper side of the rear seat console, and a swiveling unit connected between the rotation unit and the rear seat table for allowing the rear seat table to swivel centering around a swiveling axis (axis Z).

7 Claims, 16 Drawing Sheets

FOREIGN PATENT DOCUMENTS

| | | |
|---|---|---|
| JP | 2006-256387 A | 9/2006 |
| KR | 97-31737 U | 7/1997 |
| KR | 1998-035358 A | 8/1998 |
| KR | 1998-046774 U | 9/1998 |
| KR | 1998-055078 A | 9/1998 |
| KR | 10-0203493 B1 | 3/1999 |
| KR | 10-2007-0076324 A | 7/2007 |

* cited by examiner

REAR SEAT TABLE ASSEMBLY FOR VEHICLE

CROSS-REFERENCE TO RELATED APPLICATION

The present application claims priority to Korean Patent Application No. 10-2010-0084853, filed on Aug. 31, 2010, the entire contents of which is incorporated herein for all purposes by this reference.

BACKGROUND OF THE INVENTION

1. Field of the Invention

The present invention relates to a rear seat table assembly for a vehicle. More particularly, the present invention relates to a rear seat table assembly for a vehicle, in which the rear seat table assembly is arranged in front of a rear seat console.

2. Description of Prior Art

In general, a seat for a vehicle includes a seat cushion and a seat back, wherein the seat cushion is arranged at the chassis of the vehicle so that it may allow a passenger to sit down, and the seat back as a chair back is rotably arranged at the seat cushion.

Recently, for the convenience of a rear seat passenger, a vehicle with a rear seat table has been launched, wherein the rear seat table may be equipped at a rear side of a front seat back. Also, the rear seat table may be used to allow the rear seat passenger to read a book, to carry on business, and the like, and it may be used to put foodstuffs safely so that the passenger may take a meal briefly in the vehicle interior.

That is, the rear seat table of the prior art is equipped to the rear side of the front seat back so as to be rotated upward and downward. Accordingly, in case where the rear seat table is not used, the rear seat table is locked to a state adhered to the front seat back not to obstruct the rear seat passenger from moving. Also, in case where the rear seat table is used, a cup or a document to use may put on the rear seat table by upward rotating and fixing it centering around an upper axis.

But, according to the rear seat table of the prior art, when the front seat is moved to a front side for allowing the passenger to dwell in the rear seat, both of the front seat and the rear seat table are moved to the front side, and accordingly, there may occur a problem that a distance between the rear seat passenger and the rear seat table becomes remote so that the rear seat passenger may be difficult to use the rear seat table.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a rear seat table assembly for a vehicle, wherein, by equipping a rear seat table to a rear seat console, it is possible to be conveniently used since a rear seat table does not move toward although a front seat moves toward.

In an aspect of the present invention, the rear seat table assembly for a vehicle may include a rear seat table placed in front of a rear seat console, wherein the rear seat table may include an upper table and a lower table which may be selectively foldable around a table hinge portion pivotally connecting the upper table and the lower table, a locking unit arranged in the rear seat console and selectively lock the rear seat table to the rear seat console so as to maintain or release a locking state of the rear seat table, a rotation unit rotatably connecting the rear seat table and the rear seat console for allowing the rear seat table to be fixed after the rear seat table may be rotated upward centering around a rotation axis (axis X) which may be fixed to an upper side of the rear seat console, and a swiveling unit connected between the rotation unit and the rear seat table for allowing the rear seat table to swivel centering around a swiveling axis (axis Z).

A pop-up member may be coupled between the rear seat console and the rear seat table so as to allow the rear seat table to pop up by a defined angular centering around the rotation axis when the rear seat table may be released from the locking state.

The locking unit may include a button member arranged at a side of the rear seat console, an actuating rod arranged horizontally in the rear seat console, and movable straightly toward inner side of the rear seat console by pushing the button member, wherein the actuating rod may have a guide protrusion at a distal end thereof to be projected, and a locking rod arranged vertically with the actuating rod, wherein the locking rod may have a slope and coupled with the guide protrusion therein for allowing the guide protrusion to be guided thereby, and the locking rod may be supported elastically by a locking spring so as to elastically maintain or release the locking state with the upper table.

The rotation unit may include a base fixed in the rear seat console, wherein the rotation axis may be equipped to the base, a rotating member, one end of which may be rotatably combined with the base, and another end of which may be fixed to a bottom side of the lower table, a rotation latch rotatably connected to the base and interlocked with the one end of the rotating member, wherein the rotation latch maintains or releases the locking state with the rotating member by rotating round a latch axis as a center which may be fixed to the base, and a return spring, one end of which may be connected with the rotating member, and another end of which may be connected with the base.

A first protrusion and a second protrusion may be formed to the one end of the rotating member, and a first groove and a second groove may be formed at a front side and a rear side of the rotation latch so that the first and second grooves may be selectively engaged with the first and second protrusions, wherein, when the rotating member may be upward rotated from a position 0 to a position 1, the second protrusion may be geared into the second groove, when the rotating member may be more upward rotated from the position 1 to a position 2, by means of the rotation force, the second protrusion rotates the rotation latch in a counter-clock direction, and when the rotating member may be downward rotated from the position 2 to a position 3 by a defined angle, the first protrusion may be geared into the first groove so that the rotation latch may be rotated in a counter-clock direction to maintain the locking state.

When the rotating member may be upward rotated from the position 3 to the position 2, the first protrusion rotates the rotation latch in a counter-clock direction to release the locking state, and when the rotating member may be downward rotated from the position 2, the first protrusion rotates the rotation latch in a counter-clock direction by means of returning force of the return spring so that the rotating member may be returned to the position 0.

The swiveling unit may include a bracket fixed to a bottom surface of the lower table, wherein a plurality of projecting sills may be formed, a bracket cover assembled with the bracket, wherein a plurality of hooks may be formed along circumferential direction so as to hook on each of projecting sills, a bracket spring arranged between the bracket and the bracket cover so as to allow an elastic force toward an outer side of the bracket cover, and a swiveling axis fixed to pass through another end of the rotating member, the bracket cover and the bracket.

The swiveling unit additionally may include a plate arranged on the bottom side of the bracket cover and combined into the swiveling axis in a single body, and semicircular actuating protrusions may be formed to be projected at the bottom side of the bracket cover by a defined angle along circumferential direction, and actuating grooves corresponding to the actuating protrusions may be formed to be caved at the upper surface of the plate by a defined angle along circumferential direction.

The table hinge portion may include a hinge cover arranged at a folding part of the upper table and the lower table, an upper hinge axis passing through the hinge cover, wherein the upper table may be rotably supported at both ends of the upper hinge axis, a lower hinge axis combined rotably into the hinge cover, wherein the lower table may be rotably supported at both ends of the lower hinge axis, and a guide combined into the hinge cover to surface-contact with the lower table, so as to increase a frictional force with the lower table.

As described above, according to an exemplary embodiment of the present invention, although a front seat moves to a front side, it may maintain a distance between the rear seat table and a passenger as it was, wherein it is different from a rear seat table equipped to a rear side of a front seat back according to the prior art, and accordingly, it may provide the rear seat table for a vehicle to be conveniently used.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
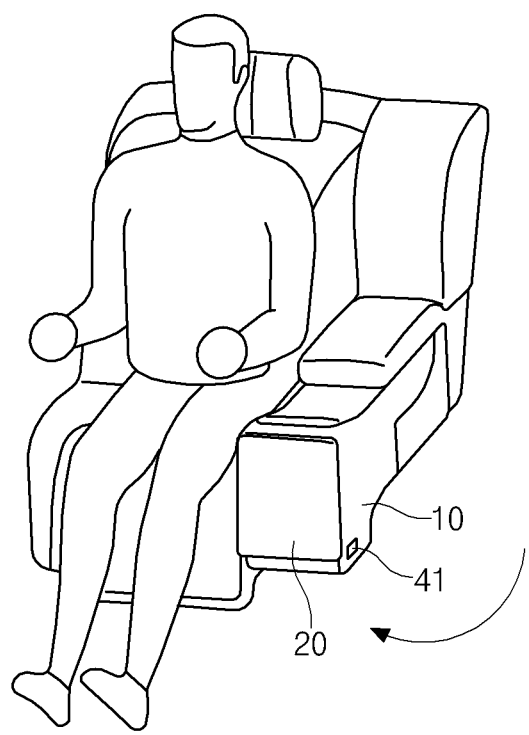
FIG. 1 is a frontal perspective view illustrating a state that a rear seat table of a rear seat table assembly for a vehicle according to an exemplary embodiment of the present invention is equipped in front of a rear seat console.
Figure 2:
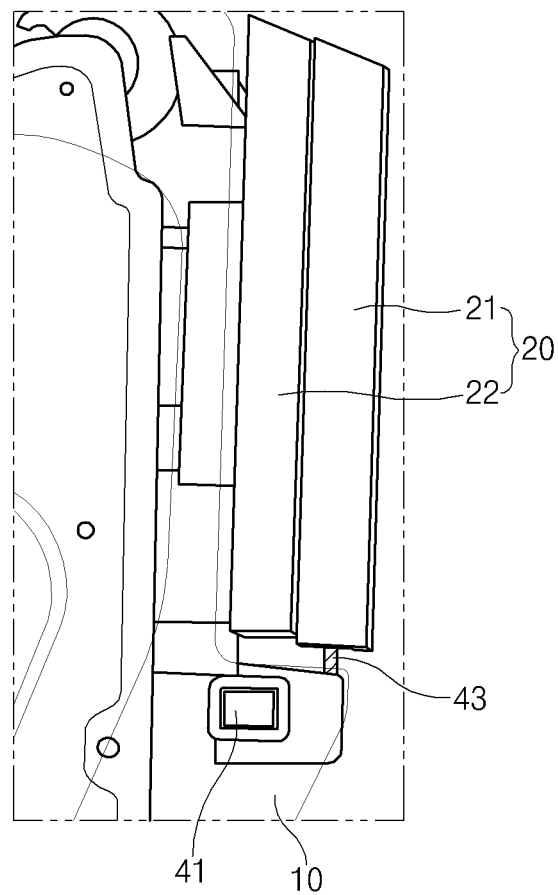
FIG. 2 is a side view of the state shown in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Now, the present invention will be explained in details with reference to the accompanying drawings.

In a rear seat table assembly according to an exemplary embodiment of the present invention, by equipping a rear seat table to a front side of a rear seat console, a passenger of a rear seat may use the rear seat table conveniently since a position of the rear seat table is not changed although a front seat moves toward.

As shown in FIGS. 1 to 9, the rear seat table assembly for a vehicle according to an exemplary embodiment of the present invention may include a rear seat table 20 placed in front of a rear seat console 10, a locking unit 40 arranged in the rear seat console 10 so as to maintain or release a locking state of the rear seat table 20, a rotation unit 50 for allowing the rear seat table 20 to be fixed after the rear seat table 20 is rotated upward centering around a rotation axis (axis X) 55, a swiveling unit 60 connected with the rotation unit 50 and the rear seat table 20 for allowing the rear seat table 20 to swivel centering around a swiveling axis (axis Z) 64. Thus, the rear seat passenger operates the locking unit 40 so as to release the locking state of the rear seat table 20 placed in front of the rear seat console 10, and accordingly, the rear seat passenger may use the rear seat table 20 by swiveling it by 90 degree after the rear seat table 20 is lifted and fixed.

In case where the rear seat passenger does not use the rear seat table 20, the rear seat table 20 is placed at the front side of the rear seat console 10 as shown in FIG. 1, and the rear seat table 20 may include an upper table 21 and a lower table 22 which are folded centering around the table hinge portion 30. That is, since the rear seat table 20 includes the upper table 21 and the lower table 22, the passenger boarding at a left side of the rear seat console 10 may use the unfolded upper table 21 by rotating the upper table 21 centering around the table hinge portion 30, and the passenger boarding at a right side of the rear seat console 10 may use the lower table 22.

The locking unit 40 is to maintain the locking state of the rear seat table 20 with the rear seat console 10 so as to prevent from a movement of the rear seat table 20 in case where the passenger does not use the rear seat table 20 as shown in FIG. 1, and is to release the locking state of the rear seat table 20 with the rear seat console 10 in case where the passenger uses the rear seat table 20.

Figure 3:
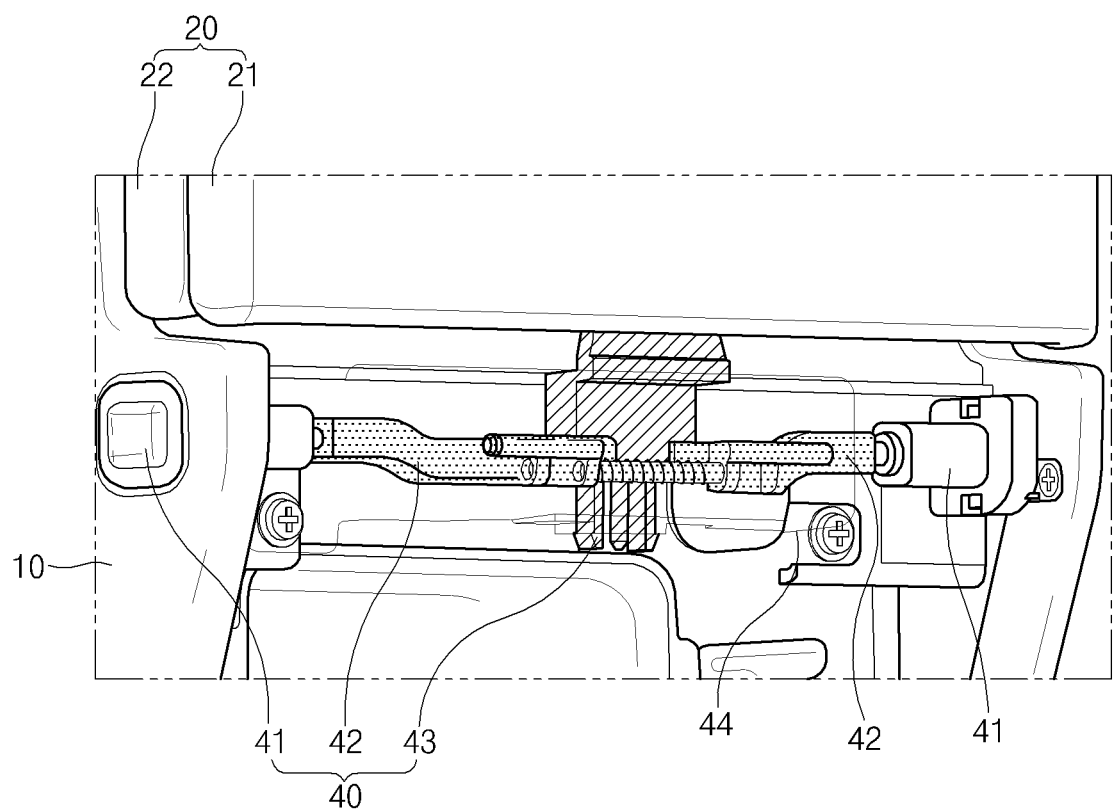
FIG. 3 is a perspective view illustrating a locking unit of a rear seat table assembly for a vehicle according to an exemplary embodiment of the present invention.
Figure 4:
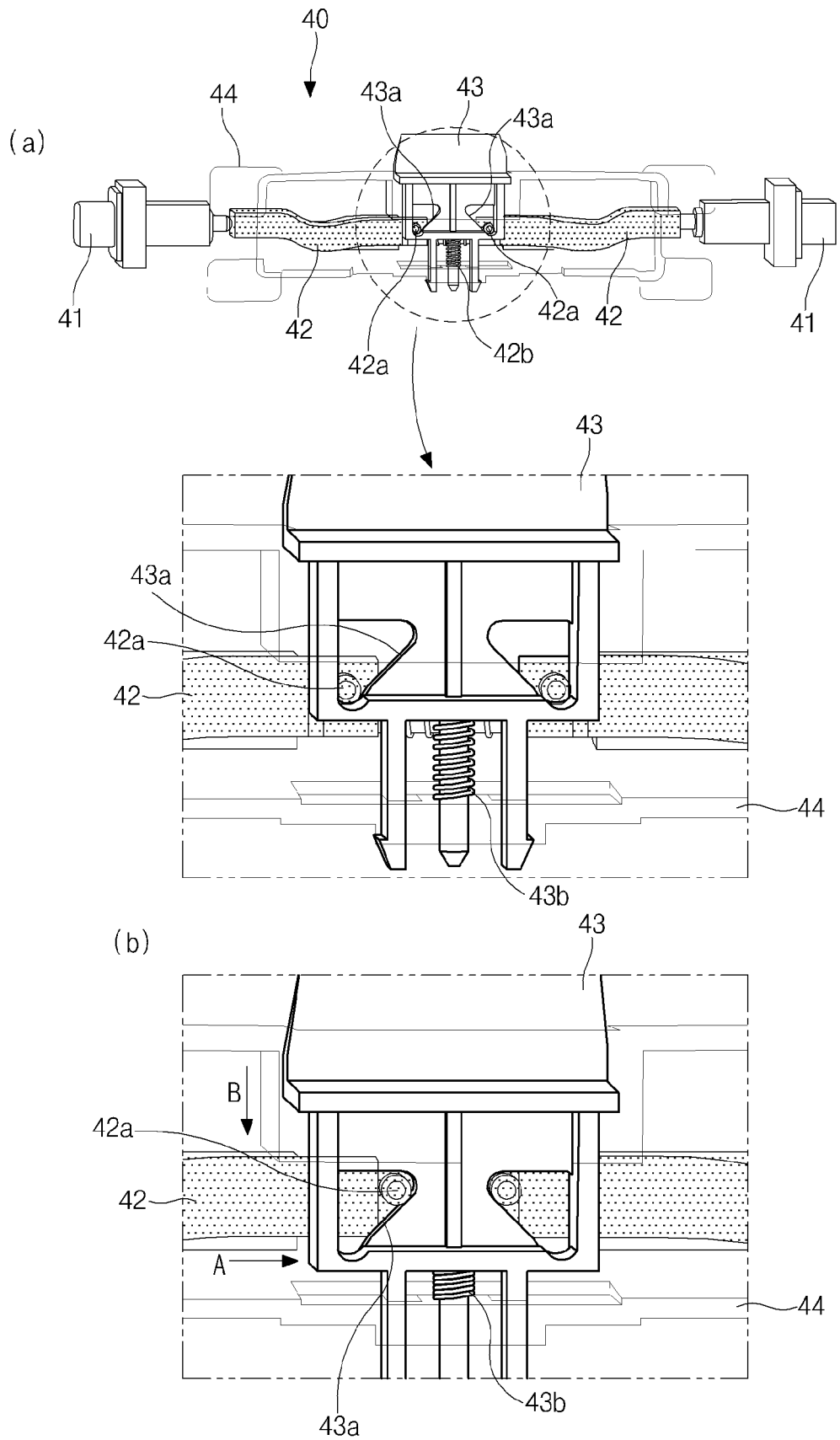
FIG. 4($a$) is a view illustrating a state that an locking rod shown in FIG. 3 maintains a locking state with an upper table, and FIG. 4($b$) is a view illustrating a state that the actuating rod shown in FIG. 4($a$) moves straightly toward its inner side when a button member is pushed, and accordingly, the locking rod moves downward to release the locking state with the upper table.

For this, as shown in FIGS. 3 and 4, the locking unit 40 may include a button member 41 arranged at a side of the rear seat console 10, an actuating rod 42 arranged horizontally in the rear seat console 10, a locking rod 43 arranged vertically with the actuating rod 42 so as to maintain or release the locking state with the upper table 21.

The button member 41 is preferably arranged at both a left side and a right side of the rear seat console 10, and the actuating rod 42 interlocked with the button member 41 is preferably arranged at both the left side and the right side of the rear seat console 10 as well.

The actuating rod 42 is arranged horizontally in the rear seat console 10. Thus, when the button member 41 is pushed, the actuating rod 42 is moved straightly toward its inner side (direction A) so as to operate the locking rod 43. At this time, a guide protrusion 42a is formed to be projected at the end of the actuating rod 42 so as to operate the locking rod 43.

A locking rod 43 is supported by a mounting bracket 44 equipped inside the rear seat console 10, and it is arranged vertically with the actuating rod 42. Accordingly, by being moved upward and downward as well when the actuating rod 42 is moved straightly, the locking rod 43 may maintain or release the locking state with the upper table 21.

At this time, the locking rod 43 has a slope 43a for allowing the guide protrusion 42a to be inserted and guided. Thus, when the actuating rod 42 is moved straightly in the direction of A, the guide protrusion 42a pushes the locking rod 43 so that locking rod 43 is moved straightly in the direction of B, and accordingly, the guide protrusion 42a may be guided along the slope 43a.

Besides, the locking rod 43 is supported elastically by a locking spring 43b toward a direction to maintain the locking state with the upper table 21, in which one end of the locking spring 43b is supported by the mounting bracket 44. Accordingly, in case where the locking rod 43 maintains the locking state with the upper table 21, the locking spring 43b becomes the maximum tensile state (Referring to FIG. 4(a)), and, in case where the locking rod 43 releases the locking state with the upper table 21 by operating the button member 41, the locking spring 43b becomes the maximum compressive state (Referring to FIG. 4(b)).

On the other hand, preferably, the rear seat table assembly for a vehicle according to an exemplary embodiment of the present invention may additionally include a pop-up member 70 (Referring to FIG. 6) for allowing the rear seat table 20 to pop up by a defined angular when the rear seat table 20 is released from the locking state by pushing the button member 41.

At this time, the pop-up member 70 may be connected between the rear seat console 10 and the rear seat table 20. The pop-up member 70 may be a spring with a defined elastic force capable of rotating the rear seat table 20 centering around the rotation axis 55 when the rear seat table 20 is released from the locking state, or may be an apparatus capable of rotating the rear seat table 20, wherein there is no doubt that it is not limited thereto. Thus, when the rear seat passenger releases the locking state between the rear seat console 10 and the rear seat table 20 by pushing the button member 41, the rear seat table 20 is rotated centering around the rotation axis 55 by a force of the pop-up member 70, and then, the rear seat passenger additionally lifts up the rear seat table 20 manually so as to fix the rear seat table 20 as shown in FIG. 6.

Figure 5:
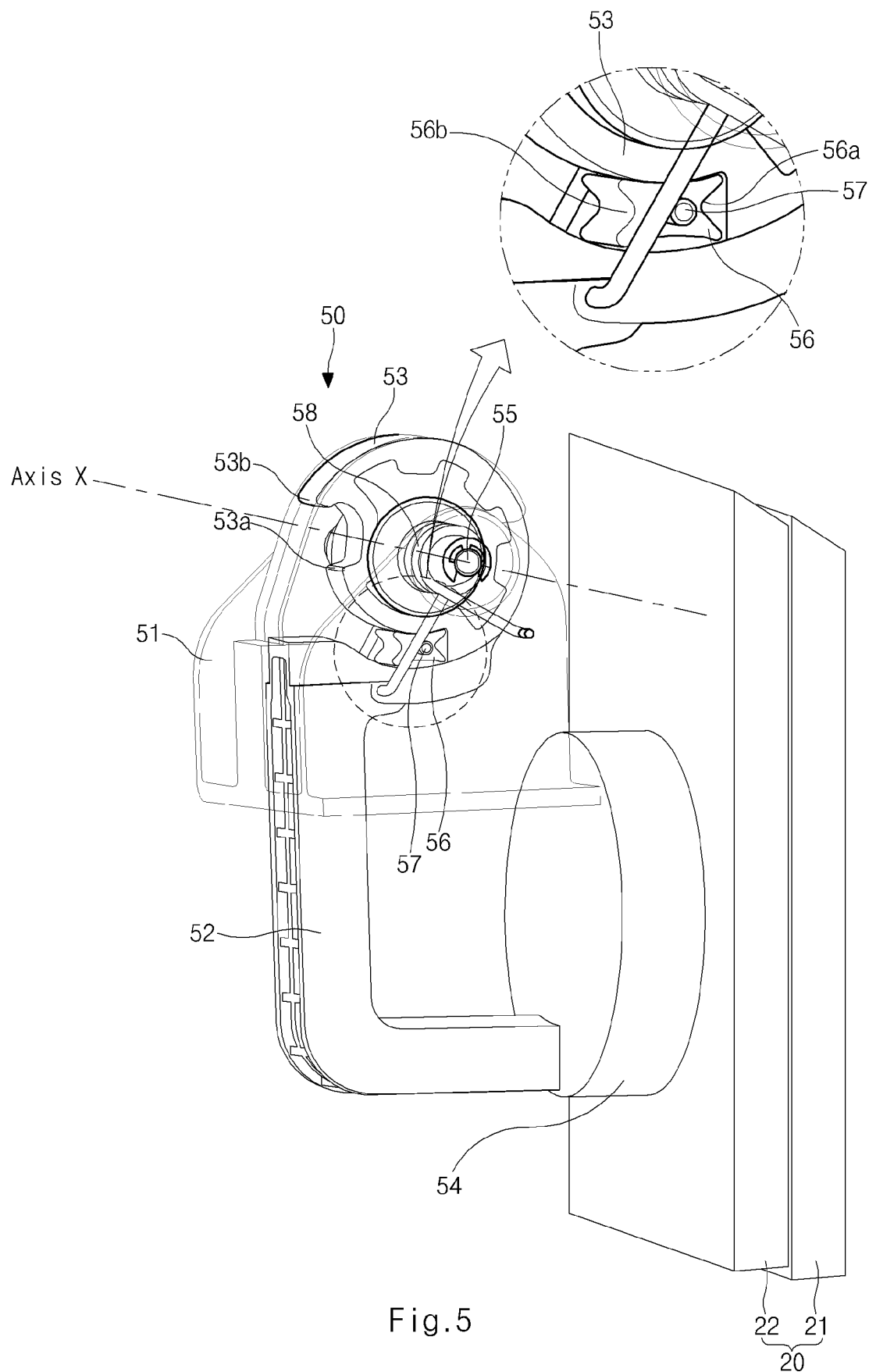
FIG. 5 is a perspective view illustrating a rotating unit in case of a state shown in FIG. 2.
Figure 6:
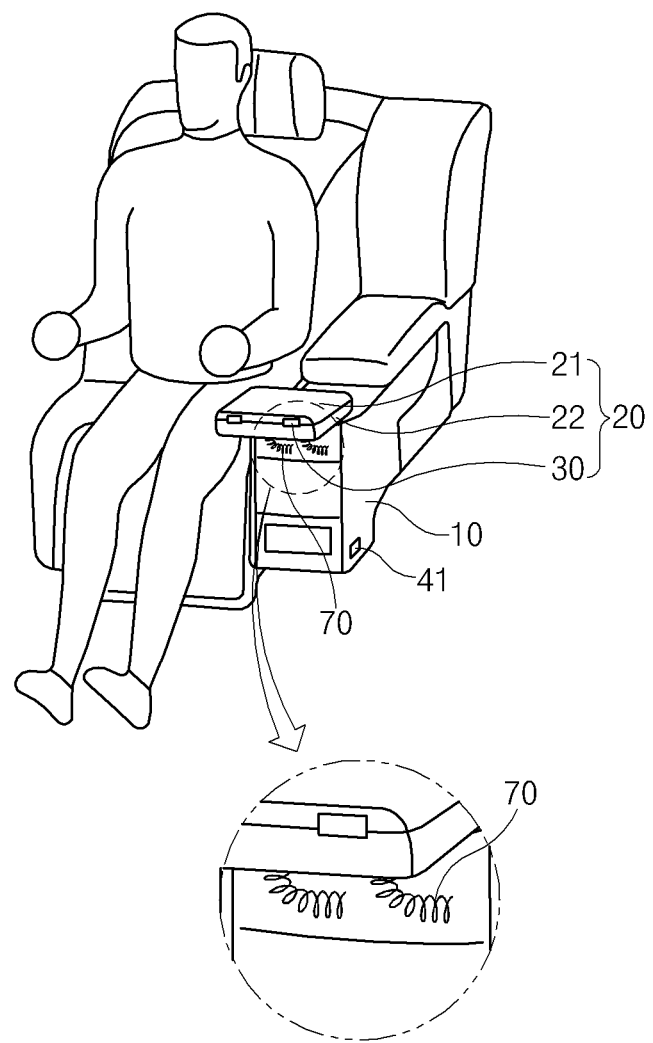
FIG. 6 is a frontal perspective view illustrating a state rotated upward after the rear seat table as shown in FIG. 1 releases a locking state.
Figure 7:
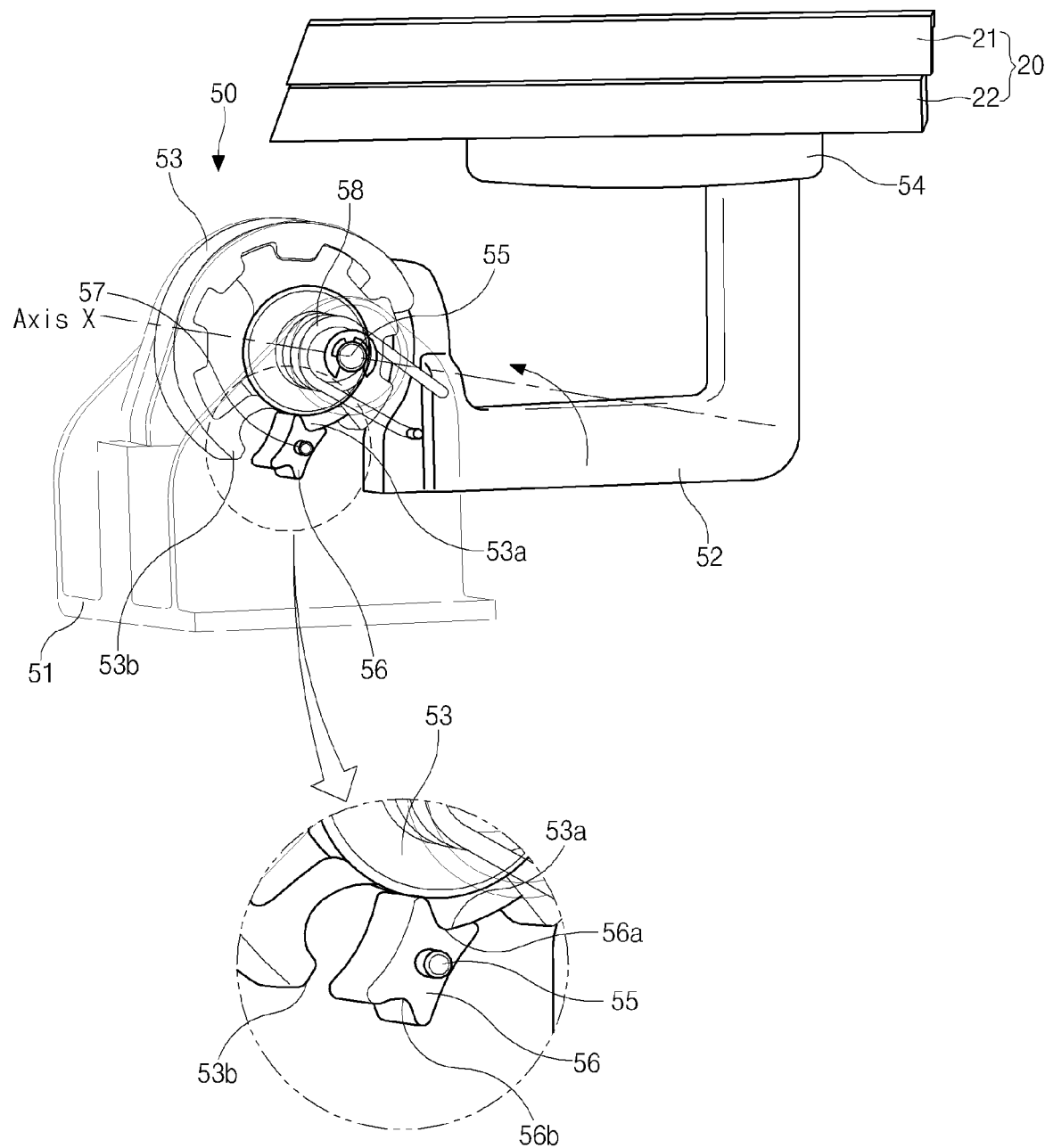
FIG. 7 is a perspective view illustrating a rotating unit in case of a state shown in FIG. 6.

The rotation unit 50 is to rotate and to fix the rear seat table 20 centering around the rotation axis 55 as shown in FIG. 6 so as to use the rear seat table 20. For this, as shown in FIG. 5, the rotation unit 50 may include a base 51 fixed in the rear seat console 10, in which the rotation axis 55 is equipped to the base 51, a rotating member 52 having two ends 53 and 54, in which its one end 53 is combined rotably with the rotation axis 55, and its another end 54 is fixed to a bottom side of the lower table 22, a rotation latch 56 interlocked with rotation of the rotating member 52 so as to maintain or release the locking state with the rotating member 52 by rotating round a latch axis 57 as a center, a return spring 58 inserted into the rotation axis 55.

The base 51 has a role in supporting the rotation axis 55 in the rear seat console 10.

The rotating member 52 is rotably combined into the rear seat table 20 in a single body centering around the rotation axis 55, wherein its one end 53 is combined ratably with a circumferential surface of the rotation axis 55, and its another end 54 is fixed to a bottom side of the lower table 22 in a single body.

At this time, a first protrusion 53a and a second protrusion 53b are formed to be projected at positions separated from one end 53 of the rotating member 52, in which the first protrusion 53a and the second protrusion 53b may rotate the rotation latch 56 by rotating along with the rotating member 52.

In addition, the return spring 58 is inserted into the rotation axis 55, in which one end of the return spring 58 is fixed to the rotating member 52, and another end of the return spring 58 is fixed to the base 51. Thus, the return spring 58 is compressed in case where the rotating member 52 is rotated upward and fixed as shown in FIG. 6, and then, the return spring 58 allows the rear seat table 20 to be automatically rotated downward by a returning force when the rotating member 52 is rotated downward so as to return from a state shown in FIG. 6 to the original position shown in FIG. 1.

The rotation latch 56 is rotated by interlocking with the rotation of the rotating member 52 centering around the latch axis 57 fixed to the base 51, wherein a first groove 56a and a second groove 56b are formed to be caved at a front side and a rear side of the rotation latch 56.

Figure 8:
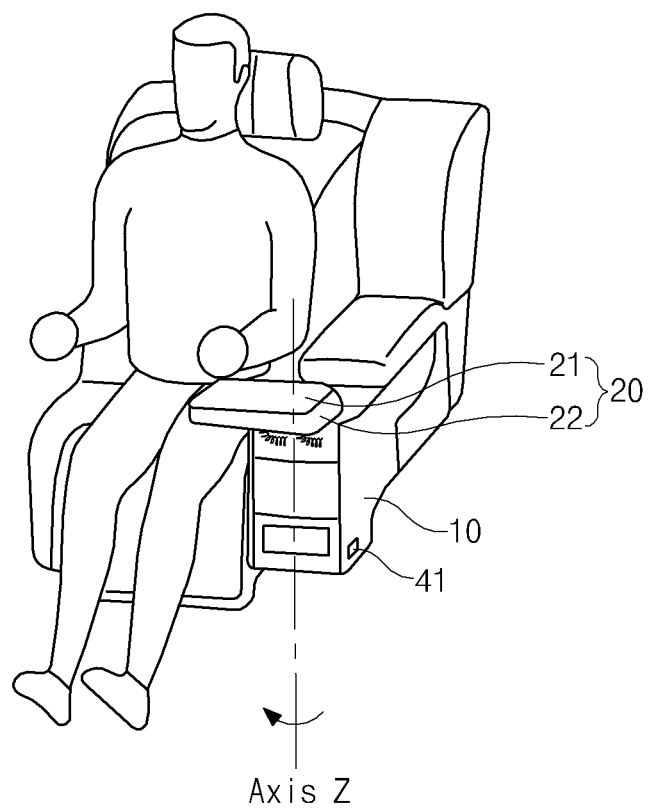
FIG. 8 is a frontal perspective view illustrating a state that the rear seat table as shown in FIG. 7 is rotated by 90 degree.
Figure 9:
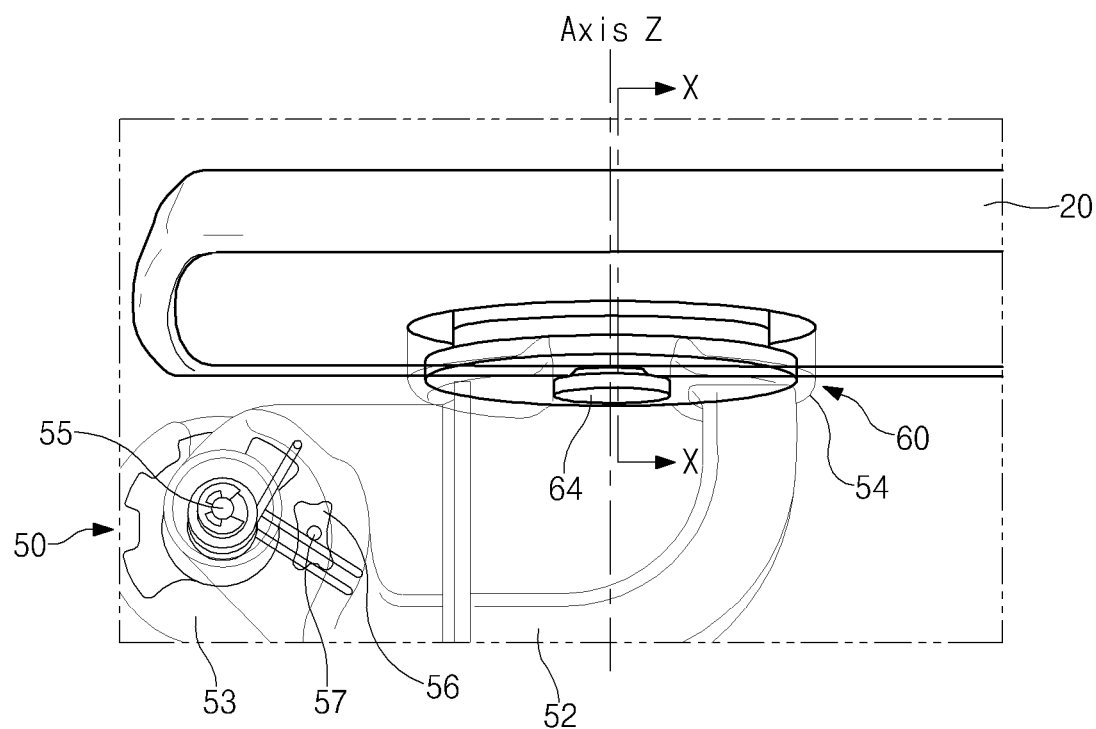
FIG. 9 is a bottom perspective view illustrating a state shown in FIG. 8.
Figure 10:
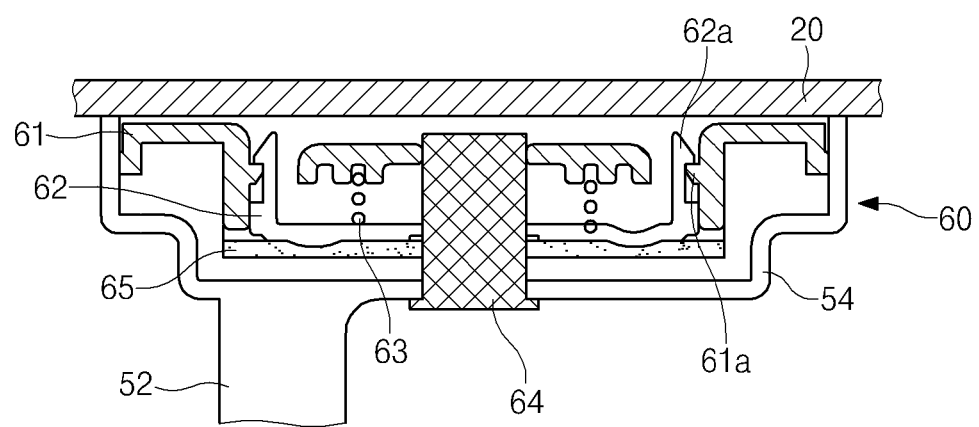
FIG. 10 is a sectional view illustrating a state cut along an X-X line of FIG. 9.
Figure 11:
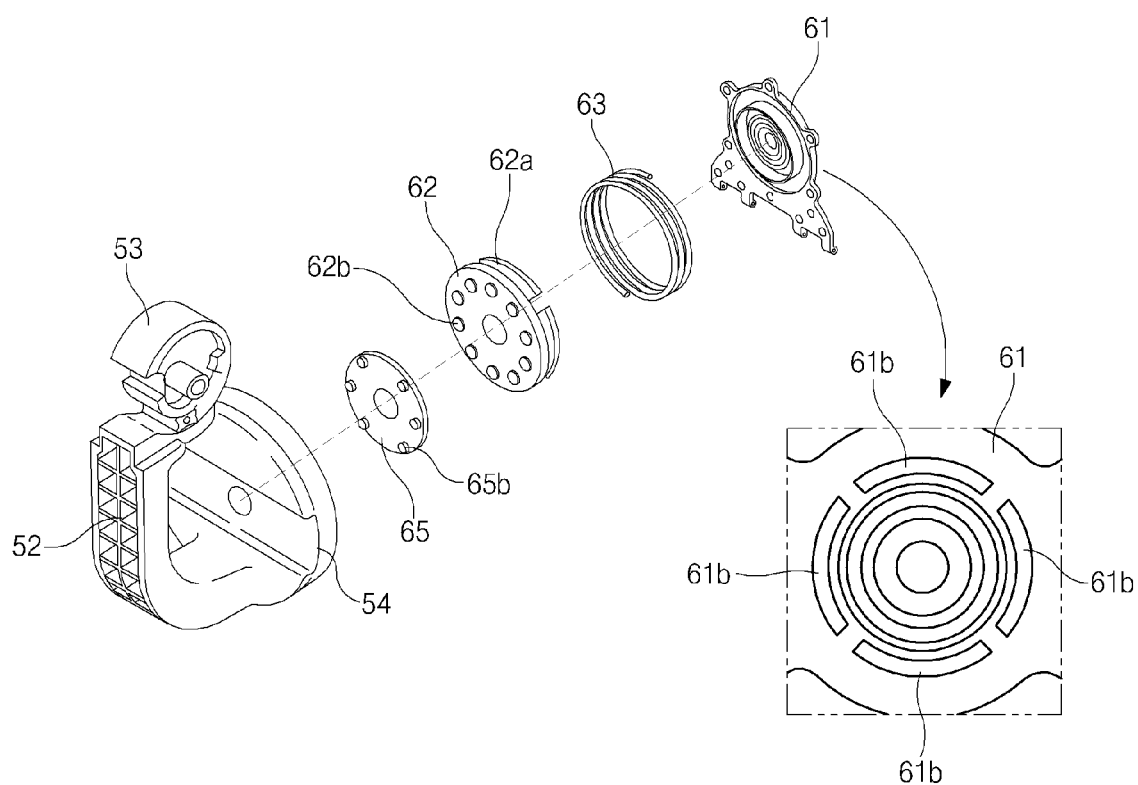
FIG. 11 is a disassembled perspective view illustrating a swiveling unit shown in FIG. 10.

On the other hand, the swiveling unit 60 is to swivel the rear seat table 20 by 90 degree centering around the swiveling axis (axis Z) 64 as shown in FIG. 8. For this, as shown in FIGS. 9 to 11, the swiveling unit 60 may include, a bracket 61 fixed to a bottom surface of the lower table 22 in a single body, a bracket cover 62 assembled with the bracket 61 in a single body, a bracket spring 63 arranged between the bracket 61 and the bracket cover 62, a swiveling axis 64.

The swiveling axis 64 is a central axis for swiveling the rear seat table 20, and it is assembled to pass through another end 54 of the rotating member 52, the bracket cover 62 and the bracket 61.

The bracket 61 is fixed to a bottom surface of the lower table 22 by a bolt, and the like, to be rotated along with the rear seat table 20 when the rear seat table 20 is swiveled by 90 degree.

At this time, a plurality of assembling holes 61b are formed at a plate surface of the bracket 61 along circumferential direction so that the hooks 62a of the bracket cover 62 may pass through to be assembled, in which the hooks 62a of the bracket cover 62 will be described later. And, a plurality of projecting sills 61a are formed around the assembling holes 61b so as to be hooked by the hooks 62a assembled through the assembling holes 61b.

The bracket cover 62 is assembled with the bracket 61 in a single body so as to rotate along with the rear seat table 20 when the rear seat table 20 is swiveled. At this time, a plurality of hooks 62a are formed in the bracket cover 62 to be projected along circumferential direction, and the hooks 62a is assembled into the projecting sills 61a by passing through the assembling holes 61b of the bracket 61.

The bracket spring 63 has two ends between the bracket 61 and the bracket cover 62, in which its one end is fixed to the bracket 61 and its another end is fixed to the bracket cover 62. The bracket spring 63 may allow a defined elastic force so that the bracket cover 62 may apply a pressure toward another end 53 of the rotating member 52.

In addition, the swiveling unit 60 additionally includes a plate 65 arranged between another end 54 of the rotating member 52 and the bottom side of the bracket cover 62 and combined into the swiveling axis 64 in a single body.

At this time, semicircular actuating protrusions 62b are formed to be projected at the bottom side of the bracket cover 62 by a defined angular along circumferential direction, and actuating grooves 65b corresponding to the actuating protrusions 62b are formed to be caved at the upper surface of the plate 65 by a defined angular along circumferential direction. Thus, the bracket cover 62 is rotated at the same time in a single body when the rear seat table 20 is rotated, and accordingly, there has an advantage that its operating sensibility may be improved by repeating the process that the actuating protrusions 62b are inserted into the actuating grooves 65b and then, they are extracted from the actuating grooves 65b.

Here, the actuating protrusions 62b and the actuating grooves 65b are formed by each of a 30 degree, but, there is no doubt that the angular is not limited thereto.

Figure 12:
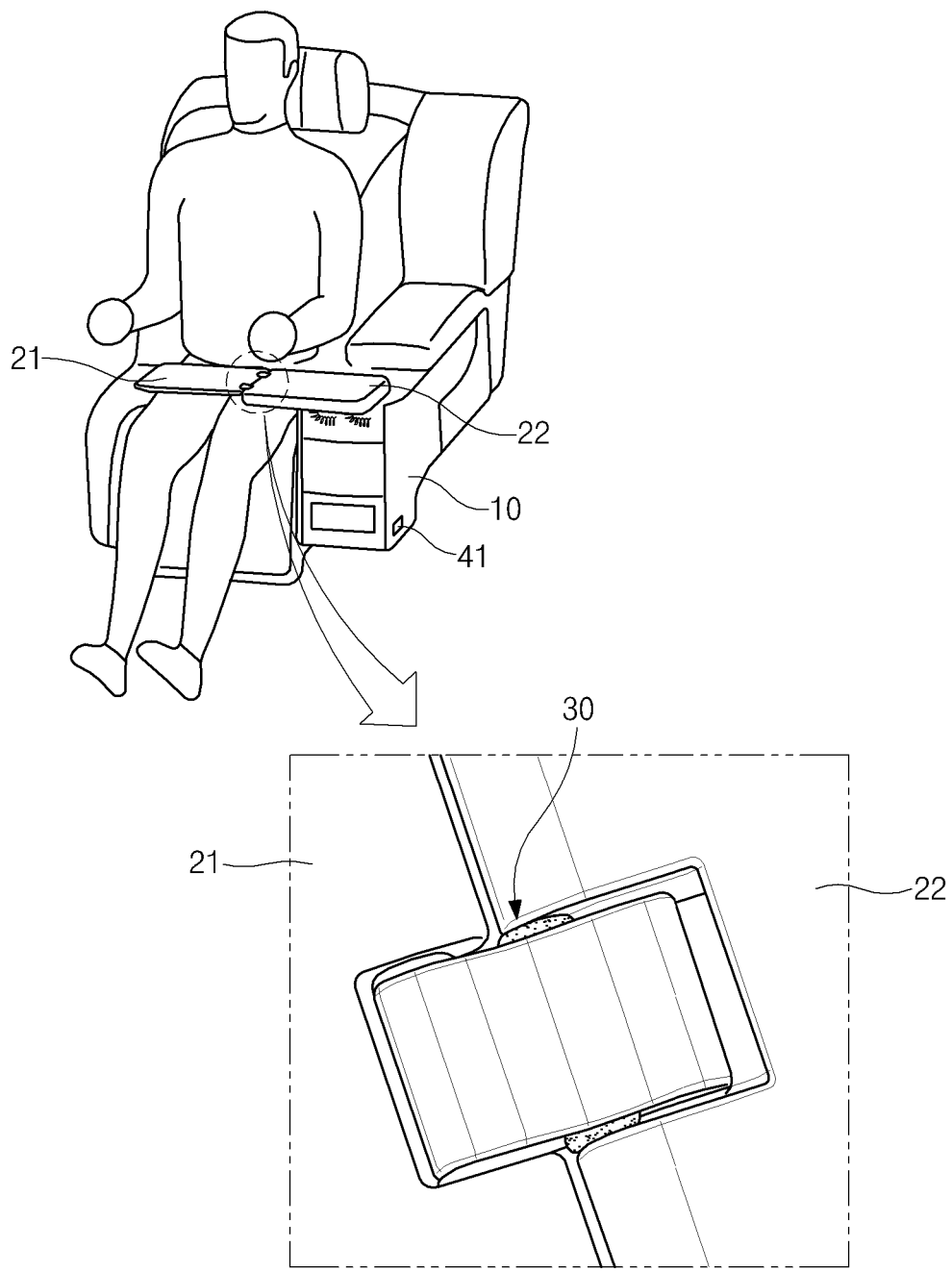
FIG. 12 is a frontal perspective view illustrating a state that the upper table shown in FIG. 8 is unfolded centering around a table hinge portion.
Figure 13:
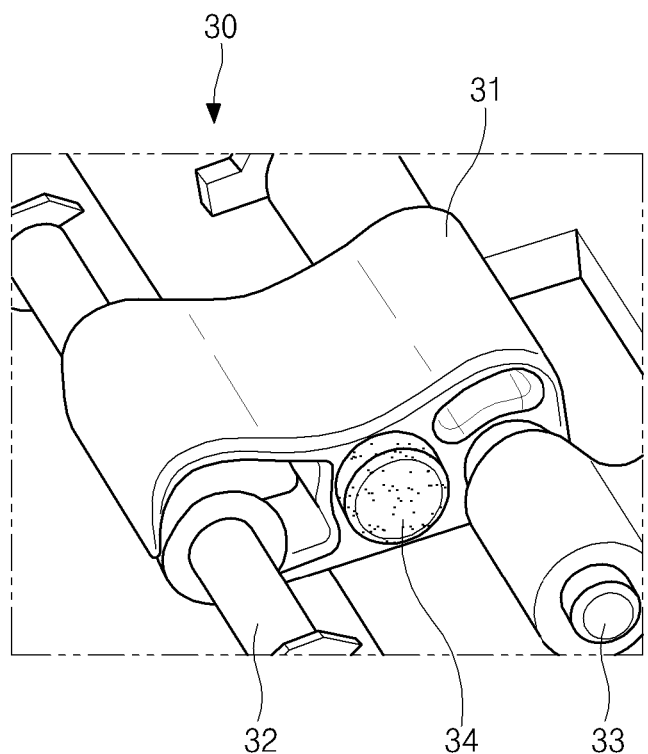
FIG. 13 is a perspective view illustrating a structure of a table hinge portion shown in FIG. 12.

On the other hand, the table hinge portion 30 as shown in FIG. 12 is to unfold the upper table 21 which is folded over the lower table 22.

At this time, the table hinge portion 30 may include a hinge cover 31 arranged at the folding part of the upper table 21 and the lower table 22, an upper hinge axis 32 inserted into the hinge cover 31 and the upper table 21, a lower hinge axis 33 inserted into the hinge cover 31 and the lower table 22, a guide 34 combined into the hinge cover 31 to surface-contact with the lower table 22. Thus, since the table hinge portion 30 according to an exemplary embodiment of the present invention has a structure that each of the hinge axes 32 and 33 is not projected toward the outside when the upper table 21 is unfolded, there has an advantage that the external appearance is beautiful.

Figure 14:
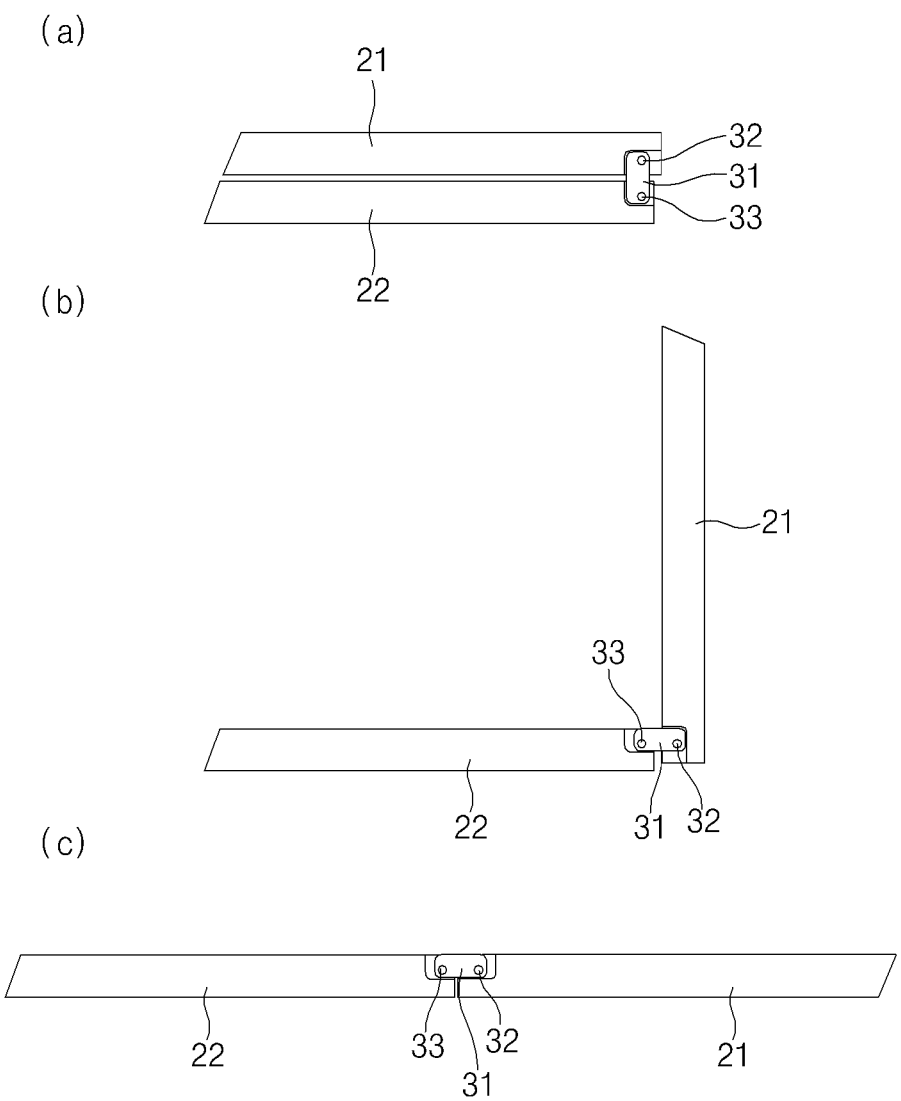
FIG. 14($a$) to FIG. 14($c$) are sectional views illustrating operational processes of an upper table and a lower table shown in FIG. 12.

The lower hinge axis 33 is combined rotably into the hinge cover 31, in which the lower table 22 is rotably supported at both ends of the lower hinge axis 33. Thus, in a state where the upper table 21 and the lower table 22 are folded as shown in FIG. 14(a), when the upper table 21 is lifted up by 90 degree, the hinge cover 31 may be rotated about 90 degree with the lower hinge axis 33 as shown in FIG. 14(b).

The upper hinge axis 32 passes through the hinge cover 31, in which the upper table 21 is rotably supported at both ends of the upper hinge axis 32. Thus, in a state where the upper table 21 is more rotated by 90 degree from a state shown in FIG. 14(b) to a state shown in FIG. 14(c), the upper table 21 may be completely unfolded by rotating with the upper hinge axis 32.

The guide 34 is surface-contacted with the lower table 22 to increase a frictional force with the lower table 22. Accordingly, when the upper table 21 is unfolded by following the procedure as shown in FIG. 14(a) to FIG. 14(c), the upper hinge axis 32 and the lower hinge axis 33 are not operated at the same time since the lower hinge axis 33 is firstly rotated and then the upper hinge axis 32 is successively rotated.

FIG. 15(a) to FIG. 15(d) are views illustrating a principle by stages that the rear seat table shown in FIG. 1 is rotated and fixed to a state shown in FIG. 6 in the rear seat table assembly for a vehicle according to an exemplary embodiment of the present invention, and FIG. 16(a) to FIG. 16(d) are views illustrating a principle by stages that the rear seat table shown in FIG. 6 is rotated and returned to a state shown in FIG. 1 in the rear seat table assembly for a vehicle according to an exemplary embodiment of the present invention.

Figure 15:
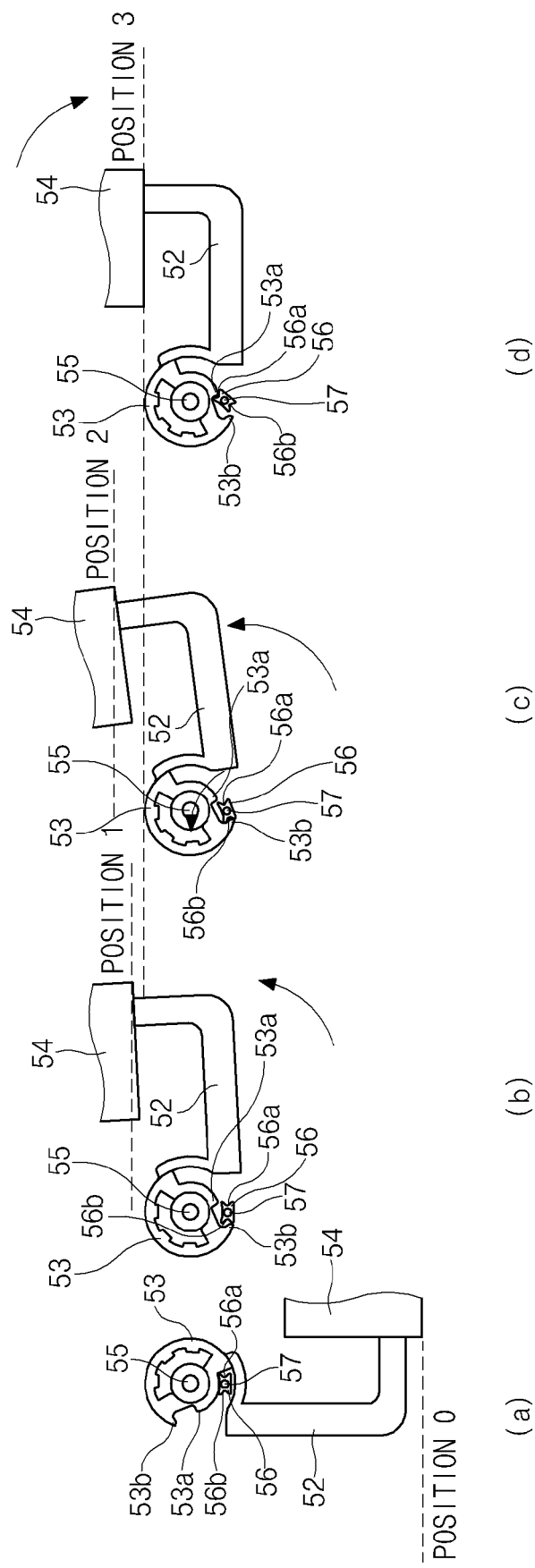
FIG. 15($a$) to FIG. 15($d$) are views illustrating a principle by stages that a rear seat table shown in FIG. 1 is rotated and fixed to a state shown in FIG. 6 in a rear seat table assembly for a vehicle according to an exemplary embodiment of the present invention.

To begin with, referring to FIG. 15, a principle that the rear seat table 20 shown in FIG. 1 is rotated and fixed to a state shown in FIG. 6 will be explained briefly.

In case where the rear seat table 20 is not used, a state that the rear seat table 20 is arranged at the position 0 as the initial position is shown in FIG. 15(a).

In case where the passenger lifts the rear seat table 20 up to the position 1 as shown in FIG. 15(b), the second protrusion 53b of the rotating member 52 is geared into the second groove 56b of the rotation latch 56. Also, in case where the passenger lifts the rear seat table 20 up to the position 2 as shown in FIG. 15(c), the second protrusion 53b rotates the rotation latch 56 in a counter-clock direction by means of the lifted force.

And then, in case where the passenger drops the rear seat table 20 down by a defined angular from the position 2 to the position 3, the first protrusion 53a of the rotating member 52, as shown in FIG. 15(d), is geared into the first groove 56a of the rotation latch 56, and accordingly, the rotation latch 56 is rotated in a counter-clock direction so as to maintain the locking state.

Figure 16:
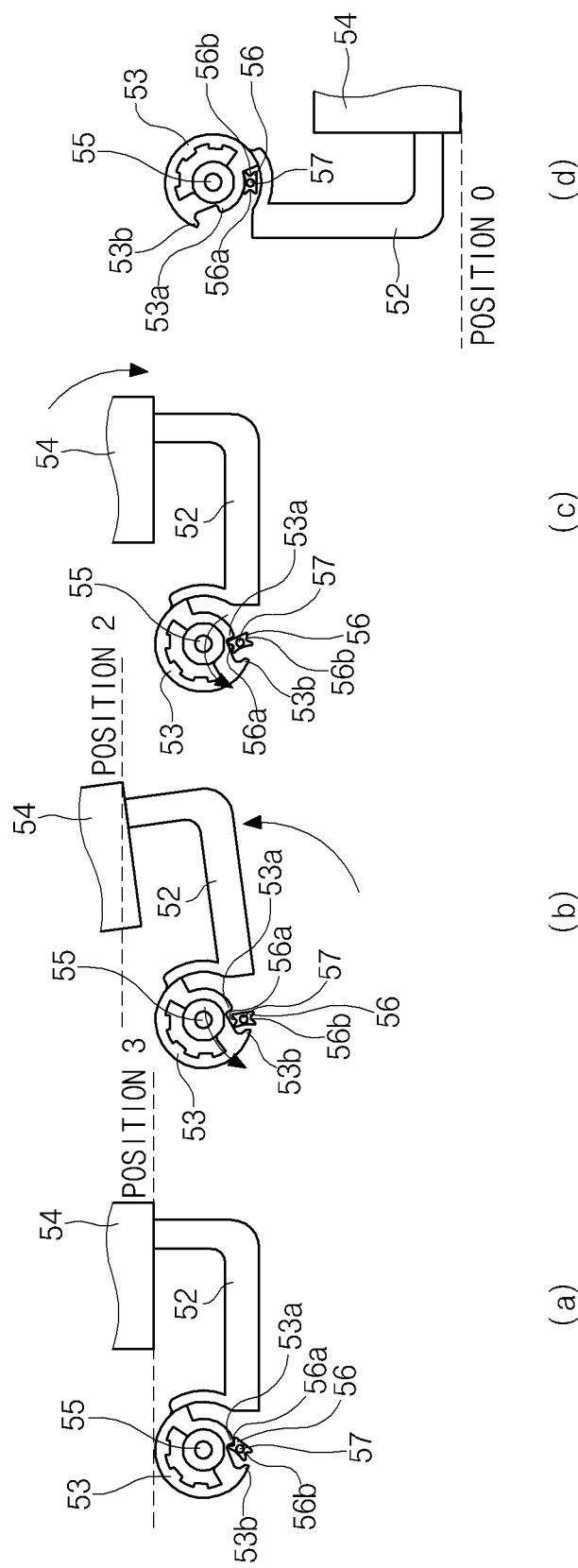
FIG. 16($a$) to FIG. 16($d$) are views illustrating a principle by stages that a rear seat table shown in FIG. 6 is rotated and returned to a state shown in FIG. 1 in a rear seat table assembly for a vehicle according to an exemplary embodiment of the present invention.

Next, referring to FIG. 16, a principle that the rear seat table 20 shown in FIG. 6 is rotated and returned to an original position shown in FIG. 1 will be explained briefly.

In case where the rear seat table 20 is used, a state that the rear seat table 20 is arranged at the position 3 as a using position is shown in FIG. 16(a).

In case where the passenger lifts the rear seat table 20 up to the position 2 as shown in FIG. 16(b), the first protrusion 53a of the rotating member 52 rotates the rotation latch 56 in a counter-clock direction so as to release the locking state.

And then, in case where the passenger drops the rear seat table 20 down by a defined angular from the position 2, the first protrusion 53a of the rotating member 52, as shown in FIG. 16(c), rotates the rotation latch 56 in a counter-clock direction by means of returning force, and accordingly, the rotating member 52 may be returned to the position 0 as shown in FIG. 16(d).

As described above, according to an exemplary embodiment of the present invention, in case where the locking state of the rear seat table 20 is maintained at the front side of the rear seat console 10, the locking state is released by pushing the button member 41. And then, the rear seat table 20 is swiveled by 90 degree after rotating and fixing the rear seat table 20 upward, and accordingly, the upper table 21 may be used in an unfolded state.

Therefore, although the front seat moves to the front side, it may maintain a distance between the rear seat table 20 and the passenger as it was, wherein it is different from the rear seat table 20 equipped to the rear side of the front seat back according to the prior art, and accordingly, it may provide the rear seat table 20 for a vehicle to be conveniently used.

For convenience in explanation and accurate definition in the appended claims, the terms "upper", "lower", "inner" and "outer are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear seat table assembly for a vehicle, the rear seat table assembly comprising:
    a rear seat table placed in front of a rear seat console, wherein the rear seat table includes an upper table and a lower table which are selectively foldable around a table hinge portion pivotally connecting the upper table and the lower table;
    a locking unit arranged in the rear seat console and selectively lock the rear seat table to the rear seat console so as to maintain or release a locking state of the rear seat table;
    a rotation unit rotatably connecting the rear seat table and the rear seat console for allowing the rear seat table to be fixed after the rear seat table is rotated upward centering around a rotation axis (axis X) which is fixed to an upper side of the rear seat console; and
    a swiveling unit connected between the rotation unit and the rear seat table for allowing the rear seat table to swivel centering around a swiveling axis (axis Z);
    wherein a pop-up member is coupled between the rear seat console and the rear seat table so as to allow the rear seat table to pop up by a defined angular centering around the rotation axis when the rear seat table is released from the locking state; and
    wherein the locking unit comprises:
        a button member arranged at a side of the rear seat console;
        an actuating rod arranged horizontally in the rear seat console, and movable straightly toward inner side of the rear seat console by pushing the button member, wherein the actuating rod has a guide protrusion at a distal end thereof to be projected; and
        a locking rod arranged vertically with the actuating rod, wherein the locking rod has a slope and coupled with the guide protrusion therein for allowing the guide protrusion to be guided thereby, and the locking rod is supported elastically by a locking spring so as to elastically maintain or release the locking state with the upper table.

2. The rear seat table assembly according to claim 1, wherein the rotation unit comprises:
    a base fixed in the rear seat console, wherein the rotation axis is equipped to the base;
    a rotating member, one end of which is rotatably combined with the base, and another end of which is fixed to a bottom side of the lower table;
    a rotation latch rotatably connected to the base and interlocked with the one end of the rotating member, wherein the rotation latch maintains or releases the locking state with the rotating member by rotating round a latch axis as a center which is fixed to the base; and
    a return spring, one end of which is connected with the rotating member, and another end of which is connected with the base.

3. The rear seat table assembly according to claim 2, wherein a first protrusion and a second protrusion are formed to the one end of the rotating member, and a first groove and a second groove are formed at a front side and a rear side of the rotation latch so that the first and second grooves are selectively engaged with the first and second protrusions,
    wherein, when the rotating member is upward rotated from a position 0 to a position 1, the second protrusion is geared into the second groove; when the rotating member is more upward rotated from the position 1 to a position 2, by means of the rotation force, the second protrusion rotates the rotation latch in a counter-clock direction; and when the rotating member is downward rotated from the position 2 to a position 3 by a defined angle, the first protrusion is geared into the first groove so that the rotation latch is rotated in a counter-clock direction to maintain the locking state.

4. The rear seat table assembly according to claim 3, wherein, when the rotating member is upward rotated from the position 3 to the position 2, the first protrusion rotates the rotation latch in a counter-clock direction to release the locking state; and
    when the rotating member is downward rotated from the position 2, the first protrusion rotates the rotation latch in a counter-clock direction by means of returning force of the return spring so that the rotating member is returned to the position 0.

5. The rear seat table assembly according to claim 1, wherein the swiveling unit comprises:
    a bracket fixed to a bottom surface of the lower table, wherein a plurality of projecting sills are formed;
    a bracket cover assembled with the bracket, wherein a plurality of hooks is formed along circumferential direction so as to hook on each of projecting sills;
    a bracket spring arranged between the bracket and the bracket cover so as to allow an elastic force toward an outer side of the bracket cover; and
    a swiveling axis fixed to pass through another end of the rotating member, the bracket cover and the bracket.

6. The rear seat table assembly according to claim 5, wherein the swiveling unit additionally comprises a plate arranged on the bottom side of the bracket cover and combined into the swiveling axis in a single body; and
    semicircular actuating protrusions are formed to be projected at the bottom side of the bracket cover by a defined angle along circumferential direction, and actuating grooves corresponding to the actuating protrusions are formed to be caved at the upper surface of the plate by a defined angle along circumferential direction.

7. The rear seat table assembly according to claim 1, wherein the table hinge portion comprises:
- a hinge cover arranged at a folding part of the upper table and the lower table;
- an upper hinge axis passing through the hinge cover, wherein the upper table is rotably supported at both ends of the upper hinge axis;
- a lower hinge axis combined rotably into the hinge cover, wherein the lower table is rotably supported at both ends of the lower hinge axis; and
- a guide combined into the hinge cover to surface-contact with the lower table, so as to increase a frictional force with the lower table.

* * * * *